United States Patent [19]

Gonzales et al.

[11] Patent Number: 5,301,242

[45] Date of Patent: Apr. 5, 1994

[54] APPARATUS AND METHOD FOR MOTION VIDEO ENCODING EMPLOYING AN ADAPTIVE QUANTIZER

[75] Inventors: Cesar A. Gonzales, Katonah, N.Y.; Eric Viscito, Danbury, Conn.

[73] Assignee: International Business Machines Corporation, Armonk, N.Y.

[21] Appl. No.: 936,724

[22] Filed: Aug. 31, 1992

Related U.S. Application Data

[63] Continuation of Ser. No. 705,234, May 24, 1991, abandoned.

[51] Int. Cl.⁵ .......................... G06K 9/36; G06K 9/46
[52] U.S. Cl. .......................................... 382/56; 380/50; 348/384; 348/409
[58] Field of Search ............................ 382/56, 50, 53; 358/105, 133, 135; 364/725; G06K 9/38, 9/36, 9/46; H04N 7/18, 7/12; G06F 7/38

[56] References Cited

U.S. PATENT DOCUMENTS

| | | | |
|---|---|---|---|
| 4,189,748 | 2/1980 | Reis | 358/133 |
| 4,386,366 | 5/1983 | Mori | 358/135 |
| 4,504,860 | 3/1985 | Nicol et al. | 358/133 |
| 4,707,738 | 11/1987 | Ferre et al. | 358/135 |
| 4,751,742 | 6/1988 | Meeker | 382/56 |
| 4,776,030 | 10/1988 | Tzou | 382/56 |
| 4,797,944 | 1/1989 | Tanaka | 382/56 |
| 4,805,030 | 2/1989 | Tanaka | 382/56 |
| 4,807,042 | 2/1989 | Tanaka | 358/433 |
| 4,853,778 | 8/1989 | Tanaka | 358/133 |
| 4,862,263 | 8/1989 | Strobach et al. | 358/135 |
| 5,001,559 | 3/1991 | Gonzales et al. | 358/133 |
| 5,025,482 | 6/1991 | Murakami et al. | 382/56 |
| 5,063,608 | 11/1991 | Siegel | 382/56 |
| 5,091,782 | 2/1992 | Krause et al. | 382/56 |

OTHER PUBLICATIONS

MPEG Video CD Editorial Committee, *Coding of Motion Pictures and Associated Audio*, Dec. 18, 1990.

Cesar Gonzales et al., *DCT Coding For Motion Video Storage Using Adaptive Arithmetic Coding*, "Signal Processing: Image Communication 2", 1990.

*Primary Examiner*—Yon J. Couso
*Attorney, Agent, or Firm*—Sterne, Kessler, Goldstein & Fox

[57] ABSTRACT

An apparatus and method for encoding of a video picture is disclosed. The video picture has a plurality of pictures. The pictures each have a plurality of macroblocks. The macroblocks each have a plurality of sub-blocks. The apparatus comprising a first module configured to generate a transform coefficient $C_{ij}$ for each of the sub-blocks of the macroblock. The apparatus further comprises a second module configured to variably quantize the transform coefficient by a scaling factor $Q_p$ based on the complexity of the picture and any rate control requirements.

10 Claims, 4 Drawing Sheets

APPARATUS AND METHOD FOR MOTION VIDEO ENCODING EMPLOYING AN ADAPTIVE QUANTIZER

This application is a continuation-in-part, of application Ser. No. 07/705,234, filed May 24, 1991 now abandoned.

TECHNICAL FIELD

The present invention relates generally to video imaging systems and methods. More particularly, the present invention relates to a system and method for digital still picture and motion video compression.

BACKGROUND ART

Due to the current interest in digital multimedia interactive programs, there has been extensive activity in the international standards bodies dealing with still picture and motion video compression. In particular, the Motion Picture Experts Group (MPEG), a group working under the sponsorship of the International Standards Organization, is rapidly converging towards a standard for the compression of digital motion video. One of the interesting features of this standard is that only the "decoding" algorithm syntax will be specified in detail. It will be thus possible to have different encoders, all of which produce bit streams compatible with the standard's syntax, and yet result in different levels of video quality. The MPEG video standard is fully described in ISO-IEC JTC1/SC2/WG11, MPEG 90/176 Rev. 2, Dec. 18, 1990. This reference is hereby incorporated in its entirety into this disclosure. The MPEG standards will be briefly discussed herein.

Generally, the MPEG video standard defines a layered architecture for compressing a video sequence. First, a sequence of video pictures is subdivided into disjoint Groups of Pictures (GOP). Each GOP is compressed independently of other GOPs to facilitate random access to any picture and also to limit the propagation of transmission errors.

Every picture in a GOP is subdivided into Macro-Blocks (MB). For a color picture, a MB is a collection of 16×16 luminance pixels and two 8×8 blocks of chrominance pixels. In MPEG, the two chrominance components are sampled at half the horizontal and vertical resolution of the luminance. As such, a MB completely describes a 16×16 color segment of a picture. In a MB, the 16×16 luminance pixels are further subdivided into four luminance blocks of 8×8 pixels.

MBs can be coded into two modes, namely: intra and predictive. In intramode, a MB is coded independently of pixel data in previous or future pictures. In predictive mode a MB is coded with reference to pixel data in either a previous (forward prediction), a future picture (backward prediction), or both (interpolative prediction). A prediction is formed by applying motion compensation techniques to the referenced pictures, and an MB error data is generated by subtracting the prediction from the original pixel data.

The MPEG standard requires that the first picture in a GOP be coded as an intrapicture. An intra picture is defined as having all of its MBs coded in the intramode. The remaining pictures of a GOP are then coded as either unidirectional predictive pictures (i.e., its MBs are coded in a mixture of intramode and forward prediction) or bidirectional predictive pictures (i.e., its MBs are coded in any of the MB coding modes).

The still or motion picture data in the form of MB's (represented by either the actual MB pixel data (intramode) or only the error data (predictive)) to be compressed is then inputted to a first compression step. This first compression step is a transformation applied by a 2-dimensional 8×8 Discrete Cosine Transform (DCT) to each of the MB blocks.

After applying the DCT to the six blocks in a MB, MPEG suggests that the resulting transform coefficients undergoes a second compression step. This second compression step is a scaling and truncation step (referred to in the art as "quantization"). Each of the DCT coefficients are uniformly quantized with a matrix of quantization steps. MPEG specifies one of two reference matrices from which the quantization steps may be derived. The choice of which matrix depends on the MB mode. This second step is an additional compression step which is necessary to achieve adequate compression of the picture data. Although the reference matrices can be defined by the encoder at the beginning of a video sequence, they remain fixed afterwards. MPEG allows dynamic changes to the matrix of quantization steps, however, by allowing a scaling factor for the reference matrices; this scaling factor can be changed for every MB. MPEG, however, does not disclose an apparatus or method for determining and changing the scaling factor. Keeping this scaling factor constant may result in the unnecessary loss of picture quality during the compression mode.

DISCLOSURE OF THE INVENTION

The present invention is directed to providing an apparatus and method for determining and changing the scaling factor left undefined by MPEG. An apparatus and method that performs this function is defined as adaptive quantization (AQ). As such, the present invention is an apparatus and method for encoding still and motion pictures employing an adaptive quantization feature to the transform coefficients for improved quality of still pictures and motion video compression.

The adaptation is performed on a MB to MB basis and varies based on the complexity of the image and the available rate control requirements.

In one embodiment, the encoder of the present invention comprises a transform coefficient module and an adaptive quantization module. The transform coefficient module of the preferred embodiment employs a conventional Discrete Cosine Transform (DCT) function to generate a transform coefficient $C_{ij}$ for each sub-block of a macroblock.

Each transform coefficient $C_{ij}$ is then inputted to the adaptive quantization module where it is variably quantized based on (1) the complexity of the image and (2) any rate control requirements that may be present in the encoding apparatus.

In one embodiment, the adaptive quantization module is configured to perform a first step quantization followed by a second step quantization. In the first step, each transform coefficient $C_{ij}$ is scaled by a fixed weighting factor matrix to yield a partially quantized coefficient $Cw_{ij}$. Two matrices can be defined in MPEG.

The second quantization step is that of scaling $Cw_{ij}$ by a second scaling factor $q_p$ which remains constant for all $Cw_{ij}$ in a macroblock, but can vary from macroblock to macroblock to yield a fully quantized coefficient $Cq_{ij}$. In one embodiment, the scaling factor $q_p$ is determined based on the complexity of the picture (macroblock) as measured by $Cw_{ij}$ and the rate control requirements.

With regard to the complexity of the picture, the adaptive quantization module will select the scaling factor $q_p$ based on a minimax algorithm applied to the $Cw_{ij}$ coefficients of the four luminance blocks contained in a MB.

In this regard, when the picture is complex the user will not be visually susceptible to image abnormalities. As such, the quantization factor, $q_p$, may be high, thus reducing the number of bits used. In contrast, when the picture is not complex, the user is susceptible to image abnormalities. As such, the quantization factor, $q_p$, may be low, thus reducing compression but at the cost of increasing the number of bits used. The minimax algorithm senses the complexity of the picture and is used, in part, to determine $q_p$.

With regard to rate control requirements, encoders typically employ an equalizing buffer to ensure that a mechanism exists for equalizing the variable bit rate at which data is generated by compression and the constant bit rate that is typical of many storage media. The equalizing buffer has an upper and lower rate control requirement. The lower rate control requirement is such that a minimum amount of information must always be stored in the buffer. The upper rate control requirement is such that only a maximum amount of information can be stored in the buffer at a given time. As such, it is important that the $q_p$ ensure that the occupancy of the buffer stay within these upper and lower bounds.

Accordingly, the present invention strikes a balance between maximization of the quality of the image while staying within the upper and lower boundaries of the rate control requirements.

Although the present invention is described in the context of the MPEG standard, it should be clear that the present invention is applicable to any video compression scheme that is transform based. The nature of the transform (Discrete Cosine, Hadamard, Lapped Overlapped, etc.) and the size and/or structure of the transform blocks and MB can be changed without affecting the fundamental ideas of this invention. For example, a macroblock could be re-defined to contain fewer or more of the blocks defined in MPEG.

The foregoing and other objects, features and advantages of the invention will be apparent from the following more particular description of (a) preferred embodiment(s) of the invention, as illustrated in the accompanying drawing(s).

BRIEF DESCRIPTION OF THE DRAWINGS

The following detailed description of the present invention will be more fully understood with reference to the accompanying drawings in which.

BEST MODE FOR CARRYING OUT THE INVENTION

The present invention is an apparatus and method for encoding of still or motion pictures. The encoder of the present invention employs an adaptive quantization (AQ) feature such that the quantization of the picture data is automatically varied to produce the high quality image while maintaining acceptable bit rate control requirements.

Figure 1:
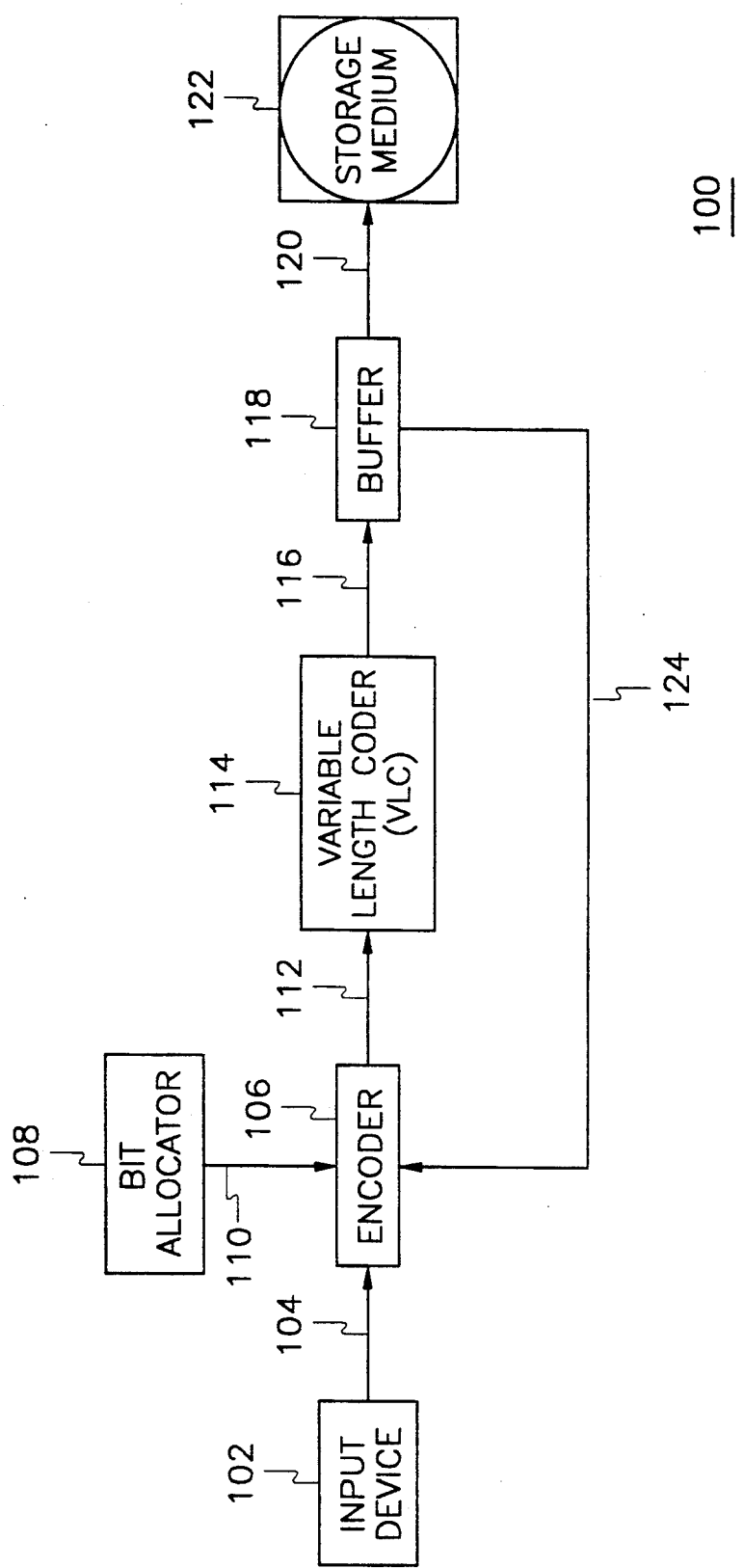
FIG. 1 is a high level block diagram showing of the motion picture encoder of the present invention.

Referring to FIG. 1, where a high level block diagram of the motion picture encoder 100 of the present invention is illustrated. As shown, the motion picture encoder 100 generally comprises an input device 102 for inputting a sequence of motion pictures. The input device 102 may be, for example, the output from a digital video cassette recorder or a digitized output from any analog image capture device, such as a camera, VCR, and the like.

The digital motion picture is inputted by input device 102 along a bus 104 to an encoder 106. As will be described more fully herein, the encoder 106 of the present invention is configured to perform a transformation and quantization step. As will also be more fully described, the quantization step of the present invention is based on the complexity of the image and the rate control requirements of a buffer 118 (to be described).

Further shown is a bit allocator 108. Bit allocator 108 is provided to allocate a specific numbers of bits for each picture. Bit allocator 108 may take a number of configurations. In one embodiment, the bit allocator 108 may be configured to assign exactly the same number of bits to each picture. Alternatively, the bit allocator 108 could be configured such that the number of bits allocated is dependent on the picture being processed. For example, the MPEG group in document ISO/JEC JTC1/SC2/W611, MPEG 90/41, July, 1990, disclosed a method for variable bit rate allocation. This reference is hereby incorporated by reference in its entirety into this specification. As will be shown more fully herein, the encoder 112 of the present invention can be configured to operate with a variety of bit allocation strategies.

The compressed data picture is then outputted along a bus 112 to a variable length coder (VLC) 114 where the encoded information is represented by at least one bit. VLC encoding is well known in the art and is a further compression step.

After the compressed data is coded by the VLC 114, it is outputted along a bus 116 to a buffer 118. Buffer 118 is provided so as to equalize the variable bit rate of the compressed data being outputted by VLC 114 on bus 116 with the constant bit rate of a storage device 122. A storage device, in this case, may be for example any media operating at a fixed data rate. For example, one common bit rate is that of a CD-ROM which operates at about a bit rate of 1.5 Mbit/s. As such, it is important to (1) ensure that there is always enough data in the buffer 118 and (2) that buffer 118 is not overflowed.

Further shown is a bus 124. Bus 124 allows the encoder 106 to sense the "fullness" (either too low or too high) of buffer 118. As will be described more fully herein, the encoder 106 is configured to quantize the transform coefficient by a scaling ratio which is determined based on the "fullness" of the buffer 118 and the complexity of the video picture.

Figure 2:
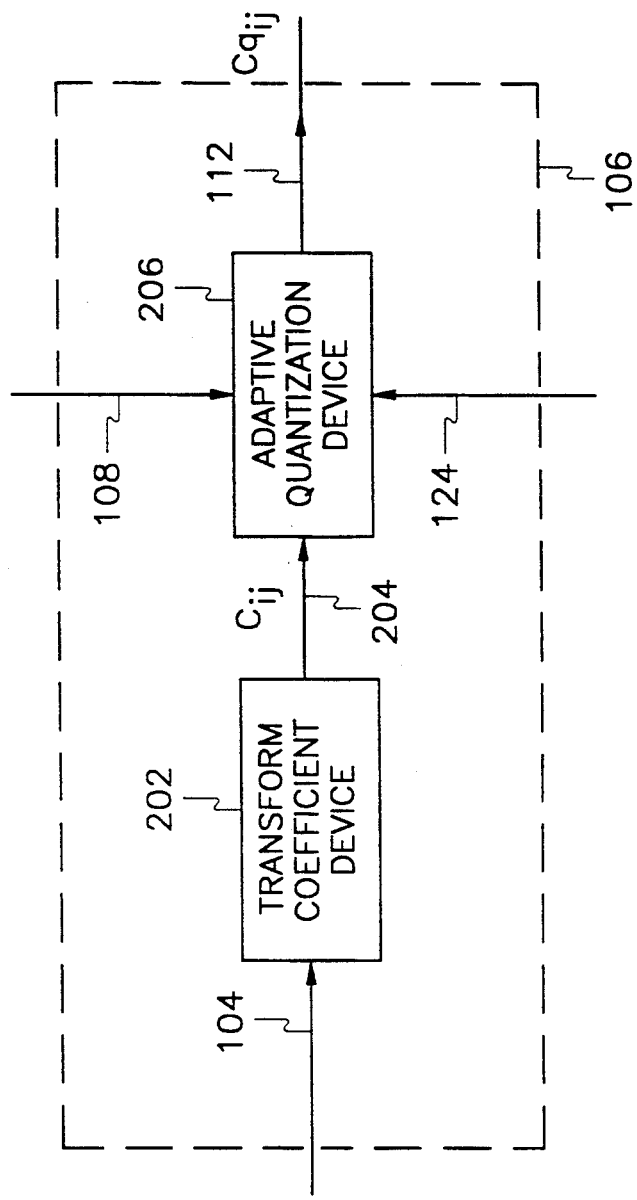
FIG. 2 is a block diagram showing the transformation coefficient module and adaptive quantization module of the present invention.

Referring now to FIG. 2, where a high level block diagram of the encoder 106 is illustrated. As shown, the encoder 106 first comprises a transform coefficient device 202. The transform coefficient device 202 is provided to transform each MB into a corresponding transform coefficient. In the preferred embodiment, the transform coefficient device 202 is configured to perform a Discrete Cosine Transform (DCT) function. The DCT algorithm is well known in the art and will not be described herein. As a result of the transform coefficient device 202, each block in an MB is transformed into a set of transform coefficients $C_{ij}$.

The $C_{ij}$ for each block is then outputted along a bus 204 to an adaptive quantization device 206. The adaptive quantization device 206 is configured to quantize each transform coefficient $C_{ij}$ by an appropriate amount such as to achieve sufficient compression while maintaining image quality. The quantized transform coefficient is represented by $Cq_{ij}$. The quantizing of each transform coefficient $C_{ij}$ is thus not fixed and is based on the (1) fullness of the buffer 118 and (2) the complexity of the image.

The mathematical foundation for the present invention will now be described. Generally, the process of uniform quantization of an 8×8 matrix of transform coefficients $C_{ij}$ can be described by the following equation;

$$Cq_{ij} = \text{INTEGER}\left[\frac{C_{ij}}{Q_{ij}} + \frac{k}{2}\right] i, j = 1, \ldots 8 \quad [1]$$

where INTEGER[x] extracts the integer portion of x; $C_{ij}$ are the transform coefficients, and $Cq_{ij}$ are the resulting quantized steps. $Q_{ij}$ are the corresponding quantization steps. The parameter k takes the value of 1 for quantization with rounding to the nearest integer and 0 for truncation. Note that throughout this application, positive transform coefficients are assumed. For negative coefficients, all formulas remain valid if the magnitude is extracted first and the sign is restored after the quantization process is completed.

For use within the MPEG standard, Equation [1] can be rewritten in a different way by making $Q_{ij}=q_p\omega_{ij}/8$. In this case, $$Cq_{ij} = \text{INTEGER}\left[\frac{8C_{ij}}{q_p\omega_{ij}} + \frac{k}{2}\right] i, j = 1, \ldots 8 \quad [2]$$

where $\omega_{ij}$ is a set of quantization weights and $q_p$ is the quantization scaling factor. In the MPEG standard, two integer matrices of $\omega_{ij}$ can be defined to code a sequence. Additionally, in the MPEG standards $q_p$ is allowed to vary between 1 and 31 on a MB to MB basis. It is this variability that permits adaptive quantization. The apparatus and method of the present invention determines the appropriate value for $q_p$. As will be more fully described herein, the present invention automatically chooses $q_p$ such as to optimize the visual appearance of a video sequence while maintaining a constant average output data rate.

The present invention attempts to distribute the available bits equally among all MBs in a picture. In this manner, MBs with high energy would be assigned a coarser quantizer than those with low-energy content. This assignment is in accordance with the results of many experiments with the human visual system that suggest that humans are more tolerant to errors in areas of a picture with great activity or energy. As such, $q_p$ should be selected according to some measure of energy content for a block (small transform coefficient $C_{ij}$ corresponds to little energy.) An alternative embodiment would also take into account the energy of neighboring MBs.

The assignment of $q_p$, however, cannot be arbitrary. In applications where the output bandwidth is fixed, $q_p$ must also be used to control the average compressed data rate. Typically, quantized coefficients together with other data are coded by variable length codes. One consequence of this coding is that the data associated with a single video picture is not constant. In order to equalize the variable data rate at which compressed data is generated, and the output data rate at which it is transmitted, the data must be buffered in the buffer device 118. Typically, the output data rate is constant. However, the apparatus and method of the present invention is equally applicable to embodiments where the output data rate is variable. Once the size of buffer 118 is chosen, the rate at which the compressed data is generated must be regulated so that the buffer 118 does not overflow or underflow (becomes empty). This rate control is also accomplished by dynamically modifying $q_p$. The encoder 100 is capable of adapting $q_p$ to improve the overall quality of a picture while simultaneously satisfying the buffer 118 size constraints.

In the preferred embodiment, the output data rate has a target rate of around 1.5 Mbit/s with a video resolution of 352×240×30 pixels/s. As will become apparent to one of ordinary skill in the art, the present invention can be extended in trivial ways to operate at higher resolutions and bit rates.

In one embodiment, the adaptive quantization device 206 operates to split the quantization process of Equation 2 into two steps; a quantization by $\omega_{ij}$ followed by a quantization by $q_p$. In between these two steps, the value of $q_p$ is selected based on the results of the first step as well as on the fullness of the output data rate equalizing buffer 118.

Returning now to FIG. 3, a block diagram illustrates one embodiment of the adaptive quantization device 206.

Figure 3:
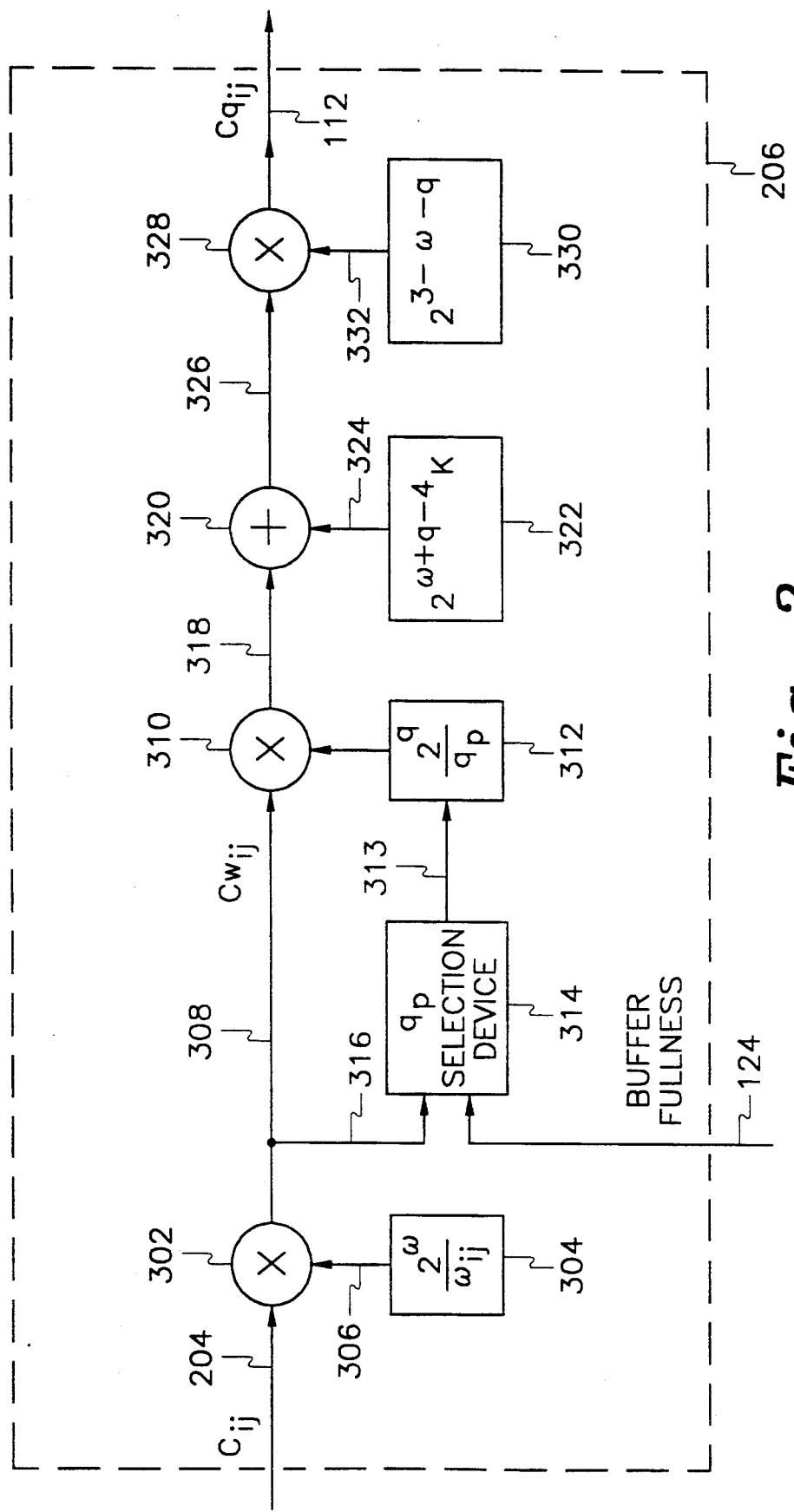
FIG. 3 is a more detailed block diagram showing the architecture of the adaptive quantization module.

As shown by FIG. 3, the transform coefficients $C_{ij}$ are inputted to a first multiplier 302 where they are multiplied with $2^\omega/\omega_{ij}$ which quantity is inputted by a block 304 along a bus 306. This is the first quantization step and yields a partially quantized coefficient $Cw_{ij}$. The scaling factor $2^\omega$ can be selected such that enough precision is maintained even if all operations are carried out with integer arithmetic. Since the values of $\omega_{ij}$ do not change for a video sequence, the multiplicative factors $2^w/\omega_{ij}$ will also remain constant and they only need be computed once at the beginning of a sequence. The pre-computed values could be stored with arbitrary precision in a table of 64 integers (one for each of the 8×8 transform coefficients). In MPEG, two $\omega_{ij}$ matrices are allowed and therefore two tables are needed.

Thereafter, the output of multiplier 302 ($Cw_{ij}$) is inputted to a second multiplier 310 where $Cw_{ij}$ is multiplied by $2^q/q_p$, denoted by a block 312. This is the second quantization step. However, unlike the first quantization step, $q_p$ is variable and is determined by a $q_p$ selection device 314. The scaling factor $2^q$ can be selected such that enough precision is maintained even if all operations are carried out with integer arithmetic. As will be shown more clearly below, quantization by $q_p$ can be carried out through multiplication by one of 31 pre-stored integer values corresponding to all possible $2^q/q_p$ values in MPEG. In this case, the q exponent determines the precision of the results of this step. There are extensions of this idea that improve further the precision of the arithmetic operations without increasing the number of bits required for the intermediate quantization results. For example, one could split the multiplication by $2^\omega/\omega_{ij}$ into a multiplication by $2^{\omega+m}/\omega_{ij}$ followed by normalization (division or binary shift) by $2^m$. Of course, if floating point arithmetic is available, no power of two scaling is necessary.

As such, the quantization step defined mathematically by Equation [2] and illustrated in FIG. 3 is split into two separate steps. The first step is mathematically expressed as:

$$Cw_{ij} = \text{INTEGER}\left[\frac{2^\omega}{\omega_{ij}} C_{ij}\right] i,j = 1, \ldots 8 \qquad [3]$$

where Equation 3 is carried out in the multiplier 302. The second step can be expressed as:

$$Cq_{ij} = 2^{3-\omega-q} \text{INTEGER}\left[\frac{2^q}{q_p} Cw_{ij} + 2^{\omega+q-4} k\right] i,j = 1, \ldots 8 \qquad [4]$$

where Equation 4 is carried out by the multiplier 310, adder 320, and multiplier 328. In Equation 4, the value of $q_p$ is chosen based, at least in part, on the values of $Cw_{ij}$ and thus the energy level (or complexity) of the macroblock.

It should be understood that if a floating point processor is used, $\omega$ and q can be set equal to zero.

The resultant quantized transform coefficient $Cq_{ij}$ is then outputted on the bus 112 to the VLC device 114.

As discussed before, $q_p$ is selected on the basis of the energy content of transform blocks, and alternatively their neighborhood, as well as on the basis of buffer 118 fullness and bit allocation considerations. The higher the value of $q_p$, the more compressed the picture becomes. As such, the fewer bits need to be allocated but at the cost of image quality. For high energy pictures, it has been found that the user cannot easily notice image abnormalities. In contrast, for low energy pictures the user can easily notice image abnormalities. As such, $q_p$ should be as low as possible for low energy pictures thus reducing compression. In the case of MPEG, because an MB naturally defines a neighborhood of four $8 \times 8$ luminance blocks, it constitutes a natural unit for measuring energy. However, because of rate control requirements, $q_p$ has an upper and lower limit. As such, it is desirable to maximize the image quality only when needed while staying within the rate control limits.

The $q_p$ selection device 314 is configured to operate generally as follows:

1. Select a first quantizer factor, in the range between 1 and 31 on the basis of bit allocation and buffer 118 fullness control considerations. The actual method of selection is not important and could be one of many possibilities. For example the above-referenced document, MPEG 90/41, describes one such method.

2. Select a second quantizer factor, $q_p^{low}$, on the basis of energy considerations for a MB. The preferred method for this selection is based on the determination of the minimum of the maximum energy content transform coefficient for a given macroblock. This can be expressed by the following steps:

a. For the 4 luminance blocks in an MB, obtain the maxima of the partially quantized $Cw_{ij}^b$ coefficients of each luminance block. This can be represented as $$Cw_{max}^b = \max_{ij}[Cw_{ij}^b] \quad b = 1, \ldots 4 \qquad [5a]$$

where the index b represents each of the four luminance blocks in a MB.

b. Determine $CW_{minimax}$ as $$Cw_{minimax} = \min_{b}[Cw_{max}^b] \qquad [5b]$$

In other words, determine the minimum of the four maximum $CW_{max}^b$ partially quantized transform coefficients ($Cw_{ij}$) corresponding to each luminance block in a MB.

c. Select $q_p^{low}$ such that $Cq_{minimax}$ is a predefined value, i.e. using Equation 4 for example, $$Cq_{minimax} = 2^{3-\omega-q} \text{INTEGER}\left[\frac{2^q}{q_p} Cw_{minimax} + 2^{\omega+q-4} k\right] \qquad [5c]$$

For the case of $Cq_{minimax} = 2^m$, the derivation of $q_p^{low}$ can be simplified significantly if the rounding factor (k=0) is ignored. In this case, $$q_p^{low} = 2^{3-\omega-m} CW_{minimax} \qquad [6]$$

The final $q_p$ selection is based on $q_p^{low}$, appropriately bounded to satisfy rate control and other constraints. For example, because $q_p^O$ is chosen on the basis of rate control considerations, a large value of $q_p^O$ suggests that the rate-equalizing buffer 118 is close to full and that we should choose $q_p \geq q_p^O$. On the other hand, if the buffer 118 is far from full, any $q_p = q_p^{low} < q_p^O$ is acceptable. A heuristic that works fairly well in MPEG where $q_p$ varies between 1 and 31 is $$q_p = \min\left\{q_p^0, \max\left\{q_p^{low}, \text{integer}\left[1 + 30\left[\frac{31}{q_p^0}\right]^\alpha\right]\right\}\right\} \qquad [7]$$

where $\alpha > 1$. In particular, for a rate around 1.5 Mbit/s, $\alpha = 2.5$ works well.

As will be obvious to one skilled in the art, other heuristics are equally possible. An additional confirmation of the $q_p$ selection device 314 could insure that no quantized luminance coefficient exceeds a maximum value. MPEG requires, for example, $Cq_{ij} < 2^8$. This requirement can be satisfied by insuring that the final $q_p$ is at least as large as the value of $q_p^{min}$ defined below $$Cw_{maxmax} = \max_{b}[Cw_{max}^b] \qquad [8]$$

$$q_p^{min} = 2^{3-\omega-8} Cw_{maxmax} \qquad [9]$$

Obviously, these constraints can also be extended to the chrominance blocks.

Figure 4:
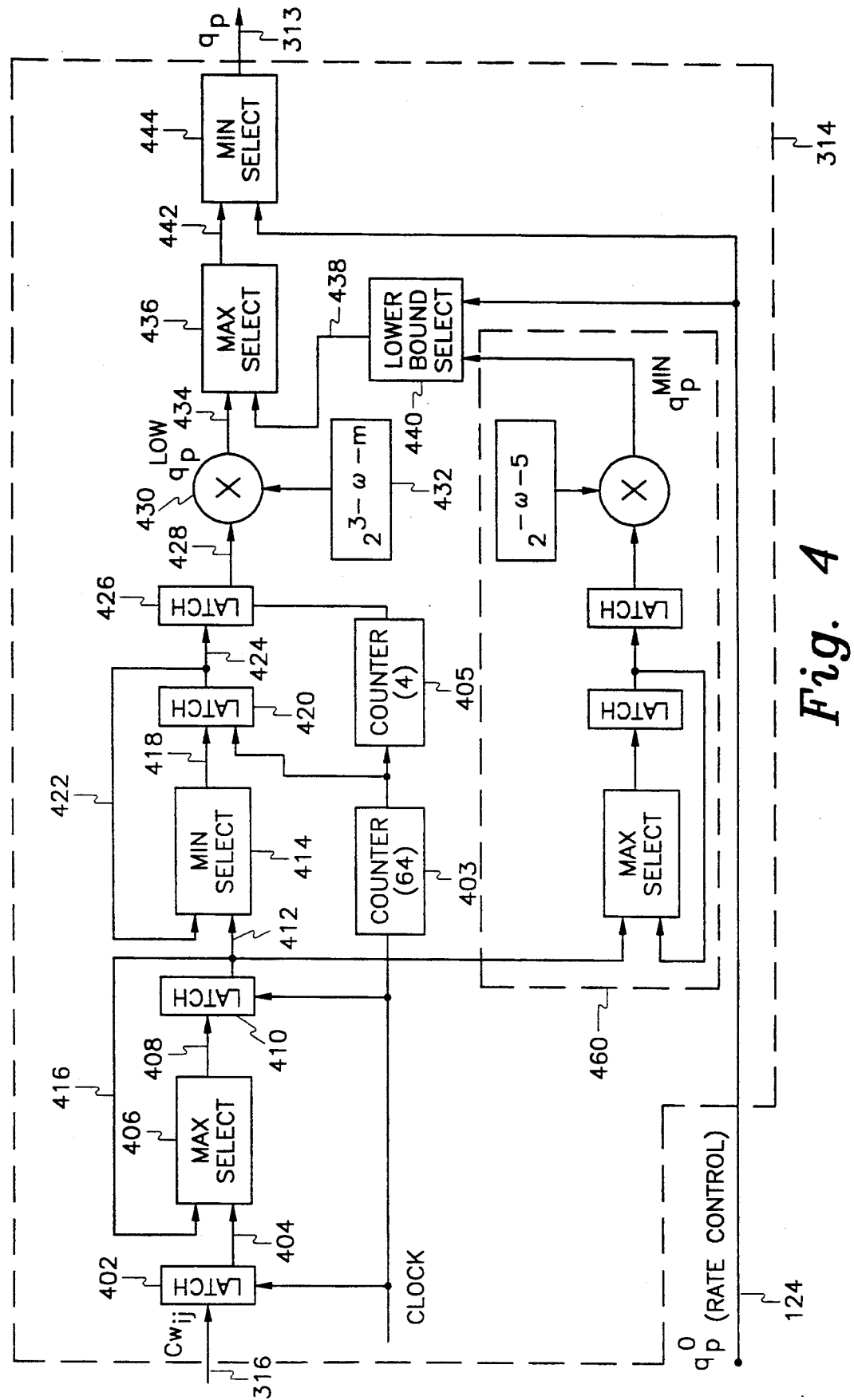
FIG. 4 is a more detailed block diagram showing the architecture of the $q_p$ selection module.

Referring now to FIG. 4, wherein the $q_p$ selection device 314 is described in more detail.

As shown, the partially quantized transform coefficients $Cw_{ij}$ are inputted along a bus 316 to a first latch 402. First latch 402 is provided to ensure that only one transform coefficient is passed to a max select module 406 (to be described). The first latch 402 only holds the data for one clock cycle.

The transform coefficients are than outputted along a bus 404 to the max select module 406. The max select module 406 is provided to determine the maximum transform coefficient for each of the four sub-blocks of each macroblock. Operation of max select module 406 is equivalent to the mathematical expression of Equation 5a.

The second latch 410 is initialized to zero. After 64 cycles, the second latch 410 will contain the maximum value among the first 64 transform coefficients $Cw_{ij}$ of a single $8 \times 8$ pixel block which also corresponds to one sub-block within a macroblock.

At this point, a 64 cycle counter 403 operates to clear the second latch 410 and likewise reset the operation of the first latch 402 and first max select module 406. The first latch 402 and the first max select module 406 are then ready for the next sequence of transform coefficients that represent the next sub-block of the macroblock.

In short, the function of first max select module 406, first latch 402, and second latch 420 is to simply pick the maximum transform coefficient $Cw_{ij}$ of each sub-block within the macroblock.

The 64 cycle counter 403 after reading 64 cycles knows that the second latch 410 contains the maximum transform coefficient $Cw_{ij}$ that corresponds to the current sub-block. As such, this maximum value is outputted along a bus 412 to a first min select module 414. Min select module 414 is configured to determine the minimum transform coefficient of the four maximum transform coefficient calculated for one macroblock. This is defined as $Cw_{minimax}$. Operation of min select module 414 corresponds to the mathematical relationship of Equation 5b.

In operation, third latch 420 is initialized to a very large value. Therefore, every time the first counter 403 reaches the count of 64 cycles, the min select module 414 is prompted to take one comparison. The comparison is with the current value stored in the third latch 420 and the current maximum transform coefficient $Cw_{ij}$ being inputted to the min select module 414 along bus 412. As such, after four cycles of the first 64 cycle counter 403, the third latch 420 will be loaded with the minimum value of the maximum transform coefficient $Cw_{ij}$ of the 4 blocks of a macroblock defined as $Cw_{minimax}$. The 4 cycle counter 405 is essentially the one that counts the 4 blocks. When the 4 luminance blocks of a macroblock have gone through this process then the fourth latch 426 gets loaded with $CW_{minimax}$ along a bus 424.

At that point, $Cw_{minimax}$ is outputted to a multiplier 430 where it is normalized to the correct power denoted by block 432. The output of multiplier 430 is $q_p^{low}$. The operation of multiplier 430 corresponds to the mathematical expression given by equation 6.

The value for $q_p^{low}$ is then outputted to a second max select module 436. The max select module 436 is generally provided to ensure that the ultimate value chosen for $q_p$ is not below the lower bounds of any rate control requirements.

The output of the max select module 436 is a value of $q_p$ greater or equal than a value below which you cannot go because of rate control requirements. If a lower value is elected, the rate equalizing buffer may begin to overflow, thus causing information to be lost. If $q_p^{low}$ goes below the lower bound, then the max select module 436 will select instead the lower bound value for $q_p$ calculated by the lower bound select module 440 (to be described).

The value outputted by the max select module 436 is outputted to a min select module 444. The min select module 444 is provided to insure that an ultimate value for $q_p$ is chosen that is less or equal to a value above which you cannot go because of rate control requirements. In other words, the max select module 436 will not allow $q_p^{low}$ to go above some maximum value $q_p^O$. In this case, the concern for rate control is that of underflowing the equalizing buffer. It could be that the buffer is almost empty and it does not have data to transmit. As such, the min select module 444 ensures that the final $q_p$ selected will not be above a certain value which is required for rate control. This value of $q_p^O$ is calculated from a measure of buffer fullness. As discussed, one method for calculation of $q_p^O$ is described in MPEG 90/41.

Finally, the set of blocks incorporated in 460 can be used to implement equations 8 and 9. We recall that the purpose of these equations is to define a value $q_p$ min which is a lower bound for $q_p$ that guarantees that the final quantized coefficients $Cq_{ij}$ will not exceed a predefined maximum. It will be recalled that the devices 414, 420, 426, 430, and 432 implement the mathematical equations 5b and 6. The devices incorporated in module 460 are the same except, for replacing a min select for a max select. This is also the difference between Equations 5b and 6, and their corresponding Equations 8 and 9.

It should be understood that the quality of intramode MBs is important for the overall video quality. In particular, the quality of the MBs in an intrapicture of a GOP is crucial for determining the quality of the rest of the pictures in that GOP. At low bit rates, the most objectionable distortion of many transform based schemes is the appearance of blockiness due to coarse quantization of the transform coefficients that lead to a mismatch of pixel intensities around the edges of the transformed blocks. This blockiness is most visible in areas of the picture that are relatively smooth, i.e. where there is little luminance activity. Once introduced, intrapicture blockiness tends to remain for the rest of a GOP; it is thus important to mitigate it in those areas where they are most visually annoying. Areas of low luminance activity are characterized by the low energy content in the AC coefficients of their DCT transform. The DC coefficient, however, only defines the average value of a pixel block and not its activity. For this reason, the present invention applies the algorithm of FIG. 4 only to the 63 AC coefficients and not to the one DC coefficient. In addition, for coding around 1.5 Mbit/s, the preferred value of $Cq_{minimax}$ is 2.

Adaptive quantization in Predictive MB's is slightly different. In this case, the DC coefficients should be included in the process of FIG. 4. For coding at around 1.5 Mbit/s, it is useful to only apply adaptive quantization to the MBs in the forward predictive pictures. For this case, $Cq_{minimax} = 1$ is preferred.

While the invention has been particularly shown and described with reference to preferred embodiments thereof, it will be understood by those skilled in the art that the foregoing and other changes in form and details may be made therein without departing from the spirit and scope of the invention.

Having thus described our invention, what we claim as new and desire to secure by Letters Patent is:

1. A video encoding apparatus configured to convert groups of blocks of digital video signals into compressible groups of blocks of digital video signals, comprising:
   (a) a transform coefficient device, having an input configured to receive a digital video signal representing a block of a video image, configured to generate a first signal representing a set of transform coefficients $C_{ij}$ in response to said received digital video signal;
   (b) an adaptive quantization device, having an input coupled to said transform coefficient device, configured to receive said first signal representing a set of transform coefficients $C_{ij}$, and to provide a second signal representing a quantized transform coefficient $Cq_{ij}$ in response to said first signal representing said set of transform coefficients $C_{ij}$;
   (c) a variable length coder, having an input coupled to said adaptive quantization device, configured to receive said second signal representing said quantized transform coefficient $Cq_{ij}$ and to provide a variable-rate signal having a variable bit rate and representing a compressed digital video signal in response to said second signal representing said quantized transform coefficient $Cq_{ij}$; and
   (d) a buffer, having an input coupled to said variable length coder, configured to equalize said variable bit rate of said variable-rate signal representing a compressed digital video signal and to provide a constant rate compressed digital video signal, and further configured to provide a third signal indicating buffer fullness.

2. The apparatus of claim 1, further comprising a bit allocator, coupled to said adaptive quantization device, configured to allocate a specific number of bits for each picture.

3. The apparatus of claim 1, further comprising a storage device, coupled to said buffer, configured to store said constant rate compressed digital video signal.

4. The apparatus of claim 1, wherein said second signal representing a quantized transform coefficient $Cq_{ij}$ is further provided in response to said third signal indicating buffer fullness.

5. The apparatus of claim 4, wherein said second signal representing a quantized transform coefficient $Cq_{ij}$ is further provided in response to complexity of the video image represented by said digital video signal.

6. The apparatus of claim 1, wherein said second signal representing a quantized transform coefficient $Cq_{ij}$ is further provided in response to complexity of the video image represented by said digital video signal.

7. A video encoding apparatus configured to convert groups of blocks of digital video signals into compressible groups of blocks of digital video signals, comprising:
   (a) a transform coefficient device, having an input configured to receive a digital video signal representing a block of a video image, configured to generate a first signal representing a set of transform coefficients $C_{ij}$ in response to said received digital video signal; and
   (b) an adaptive quantization device, having an input coupled to said transform coefficient device, configured to receive said first signal representing a set of transform coefficients $C_{ij}$, and to provide a second signal representing a quantized transform coefficient $Cq_{ij}$ in response to said first signal representing said set of transform coefficients $C_{ij}$, wherein said adaptive quantization device comprises:
      (1) a first multiplier configured to provide a third signal representing partially quantized video data $CW_{ij}$ in response to said first signal representing a set of transform coefficients $C_{ij}$;
      (2) a $q_p$ selection device, coupled to said first multiplier, operable to provide a fourth signal representing a quantization factor $q_p$ in response to said third signal representing partially quantized video data $C_{ij}$; and
      (3) a second and third multiplier and an adder, configured to transform said third signal representing partially quantized video data $C_{ij}$ into said second signal representing said quantized transform coefficient $Cq_{ij}$, based on said fourth signal representing said quantization factor $q_p$.

8. The apparatus of claim 7, further comprising:
   (c) a variable length coder, having an input coupled to said adaptive quantization device, configured to receive said second signal representing said quantized transform coefficient $Cq_{ij}$ and to provide a variable-rate signal having a variable bit rate and representing a compressed digital video signal in response to said second signal representing said quantized transform coefficient $Cq_{ij}$; and
   (d) a buffer, having an input coupled to said variable length coder, configured to equalize said variable bit rate of said variable-rate signal representing a compressed digital video signal and to provide a constant rate compressed digital video signal, and further configured to provide a fifth signal indicating buffer fullness.

9. The apparatus of claim 7, wherein said fourth signal representing said quantization factor $q_p$ is further provided in response to a signal representing fullness of a rate buffer.

10. The apparatus of claim 7, wherein said $q_p$ selection device comprises:
   (a) a first max select module, having an input to receive said third signal representing partially quantized video data $CW_{ij}$, configured to determine a maximum transform coefficient for each of four blocks of each group of blocks, and to generate a firth signal representing the same;
   (b) a first min select module, having an input coupled to said first max select module, configured to determine a minimum transform coefficient for each four blocks of each group of blocks, and to generate a sixth signal representing the same;
   (c) a normalizing multiplier, having an input coupled to said first min select module, configured to normalize said sixth signal representing said minimum transform coefficient for each of four blocks of each group of blocks, and further configured to provide a seventh signal representing the same;
   (d) a $q_p$ min selection module, having an input coupled to said first max select module, configured to select a value of $q_p$ that is a lower bound for $q_p$, and to provide an eighth signal representing the selected value of $q_p$ min;

(e) a lower bound select module, having a first input coupled to said $q_p$ min selection module and a second input coupled to said buffer, configured to provide a ninth signal representing a lower bound of $q_p$;

(f) a second max select module, having a first input coupled to said normalizing multiplier and a second input coupled to said lower bound select module, configured to provide a tenth signal representing a value of $q_p$ that is the greater of said seventh signal and said ninth signal; and (g) a second min select module, having a first input coupled to said second max select module and a second input coupled to said buffer, configured to select a value for $q_p$ that is not greater than rate control requirements allow and further configured to provide an eleventh signal representing this selected value of $q_p$.

* * * * *